United States Patent [19]
Utter et al.

[11] Patent Number: 5,815,649
[45] Date of Patent: Sep. 29, 1998

[54] DISTRIBUTED FAULT TOLERANT DIGITAL DATA STORAGE SUBSYSTEM FOR FAULT TOLERANT COMPUTER SYSTEM

[75] Inventors: David A. Utter, Princeton; Susan J. Lo Verso, Southborough; Laurie E. Friedman, Westborough; Steven Haid, Bolton; Gregory S. LeBlanc, Lunenburg; Paul H. Hansen, Marlborough, all of Mass.

[73] Assignee: Stratus Computer, Inc., Marlboro, Mass.

[21] Appl. No.: 546,234

[22] Filed: Oct. 20, 1995

[51] Int. Cl.$^6$ ............................................. G01F 11/08
[52] U.S. Cl. ............................ 395/112.04; 315/200.4
[58] Field of Search ........................... 395/182.04, 441, 395/200.31, 200.03, 182.05, 200.45, 200.41; 711/114, 153, 173; 364/268.3, 268.9, 269.1

[56] References Cited

U.S. PATENT DOCUMENTS

| 4,654,654 | 3/1987 | Butler et al. | 340/825.5 |
|---|---|---|---|
| 4,993,030 | 2/1991 | Krakauer et al. | 395/182.04 |
| 5,089,958 | 2/1992 | Horton et al. | 395/182.03 |
| 5,276,860 | 1/1994 | Furtier et al. | 395/182.04 |
| 5,423,046 | 6/1995 | Nunnelley et al. | 395/750 |
| 5,440,732 | 8/1995 | Lomet et al. | 395/600 |
| 5,504,873 | 4/1996 | Martin et al. | 395/438 |
| 5,513,314 | 4/1996 | Kandasamy et al. | 395/182.04 |
| 5,550,986 | 8/1996 | Dulac | 395/280 |
| 5,557,770 | 9/1996 | Bhide et al. | 395/488 |
| 5,566,316 | 10/1996 | Fechner et al. | 395/441 |
| 5,568,629 | 10/1996 | Gehtry et al. | 395/441 |
| 5,584,008 | 12/1996 | Shimoda et al. | 395/441 |
| 5,584,018 | 12/1996 | Kamiyama | 395/442 |
| 5,586,310 | 12/1996 | Sharman | 395/600 |
| 5,627,961 | 5/1997 | Sharman | 395/182.04 |
| 5,664,172 | 9/1997 | Antoshenkov | 395/604 |
| 5,737,601 | 4/1998 | Jain et al. | 707/201 |

*Primary Examiner*—Robert W. Beausoliel, Jr.
*Assistant Examiner*—Scott T. Baderman
*Attorney, Agent, or Firm*—Richard A. Jordan

[57] ABSTRACT

A fault-tolerant computer system comprises a plurality of processing nodes and a plurality of storage nodes interconnected by a network. The processing nodes perform processing operations in connection with user-generated processing requests. The processing nodes, in connection with processing a processing request, generate storage and retrieval requests for transmission to the storage node to enable storage of data thereon and retrieval of data therefrom. The storage nodes store data in at least one replicated partition group comprising a plurality of replicated partitions distributed across the storage nodes. A storage node, on receiving a retrieval request from a processing node provide the requested data to the processing node. In addition, on receiving a storage request from a processing node, a storage node initiates an update operation to update all of the replicated partitions in the replicated partition group. Following correction of a malfunction or failure of a storage node, partitions maintained by the malfunctioning or failed storage node can be recovered by use of the other members of the replicated partition group.

43 Claims, 6 Drawing Sheets

FIG. 3

PARTITION TABLE 60

| PART NO. 62 | LENGTH 63 | STO DEV ID 64 | BLOCK 65 | BLKCNT 66 | PART NAME 67 |
|---|---|---|---|---|---|
| | | | | | |
| ⋮ | | | | | |
| | | | | | |

REPLICATION TABLE 70

| REPL GROUP ID. 72 | STORE NODE ID 74 | PARTITION NO 65 | PARTITION STATE 75 |
|---|---|---|---|
| | ⋮ | | |
| | | | |
| | ⋮ | | |
| | | | |

71(1) ... 71(R), 73(1)(1) ... 73(1)(P)

DISTRIBUTED FAULT TOLERANT DIGITAL DATA STORAGE SUBSYSTEM FOR FAULT TOLERANT COMPUTER SYSTEM

INCORPORATION BY REFERENCE

U.S. patent application Ser. No. 08/546,347, filed on even date herewith, in the name of John D. Service, et al., and entitled System Console For Fault Tolerant Computer System, (Atty. Docket No. STR-002), incorporated herein by reference.

FIELD OF THE INVENTION

The invention relates generally to the field of digital computer systems, and more particularly to a distributed fault tolerant digital data storage subsystem for use in connection with a fault tolerant computer system. The distributed fault tolerant storage subsystem provides for convenient replication of data among a number of elements of the storage subsystem and recovery following correction of a malfunction or other failure without intervention of the computer system's processing elements.

BACKGROUND OF THE INVENTION

Digital computer systems are used in a number of applications in which virtually continuous, error free operation is important to the operation of businesses or other entities using the systems. For example, in banking, computer systems are used to maintain account information and update account balances, and it is important for a bank to be able to provide accurate and up-to-date account information virtually instantaneously. Similarly, computers are used to monitor and control of airplane traffic, and around crowded airports and along major air corridors, it is vital that the computers be configured so that the air traffic control systems are continuously available. Computers are also used to control switching systems for the public telephone system, and it is similarly important that the computers be configured provision be made so that the telephone systems be continuously available.

It is generally possible to build computer systems which have extremely reliable components to accomplish tasks such as these and numerous others, and to provide preventive maintenance in such a way and with such frequency that failures are extremely improbable. However, such high-reliability computer systems would be extremely expensive to build and maintain. Accordingly, "fault-tolerant" computer systems have been developed, which is generally designed with the expectation that one or more element of the system may fail at some point in its operation, but that if an element does fail, other elements are available to detect the failure and ensure that the system will continue to give proper results. Such fault-tolerant computer systems will generally be much less expensive to build and maintain, since they may be constructed of components which individually are of lower reliability than those of high-reliability computer systems, and thus would cost less to build, and maintenance costs would also be lower. Fault-tolerant computer systems generally include redundant components which operate in parallel, and when a fault is detected in one element the other components are available to continue operation. A number of schemes may be used to detect a fault, such as fault detection circuitry which can detect certain types of faults. In addition, if a fault-tolerant system includes at least, for example, three processing components operating in parallel, the system can compare outputs of the three components and, if the outputs of two of the processing components agree but the output the third processing element differs from that of the other two, the system can with a high degree of confidence draw the inference that the one processing component is faulty and its output should be ignored and that the outputs from the two processing components which agree with each other are correct and should be used.

SUMMARY OF THE INVENTION

The invention provides a new and improved storage subsystem for use in connection with a fault-tolerant computer system, in particular a distributed storage subsystem including a plurality of storage nodes providing for replication of data and quick recovery without the necessity of intervention by the computer system's processing elements.

In brief summary, the new fault-tolerant computer system comprises a plurality of processing nodes and a plurality of storage nodes interconnected by a network. The processing nodes perform processing operations in connection with user-generated processing requests. The processing nodes, in connection with processing a processing request, generate storage and retrieval requests for transmission to the storage node to enable storage of data thereon and retrieval of data therefrom. The storage nodes store data in at least one replicated partition group comprising a plurality of replicated partitions distributed across the storage nodes. A storage node, on receiving a retrieval request from a processing node provide the requested data to the processing node. In addition, on receiving a storage request from a processing node, a storage node initiates an update operation to update all of the replicated partitions in the replicated partition group. Following correction of a malfunction or failure of a storage node, partitions maintained by the malfunctioning or failed storage node can be recovered by use of the other members of the replicated partition group.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

FIGS. 3 through 6 depict data structures maintained by the processing node and storage node depicted in FIG. 2, which are useful in understanding the operation of the processing node and storage node depicted in FIGS. 1 and 2.

DETAILED DESCRIPTION OF AN ILLUSTRATIVE EMBODIMENT

Figure 1:
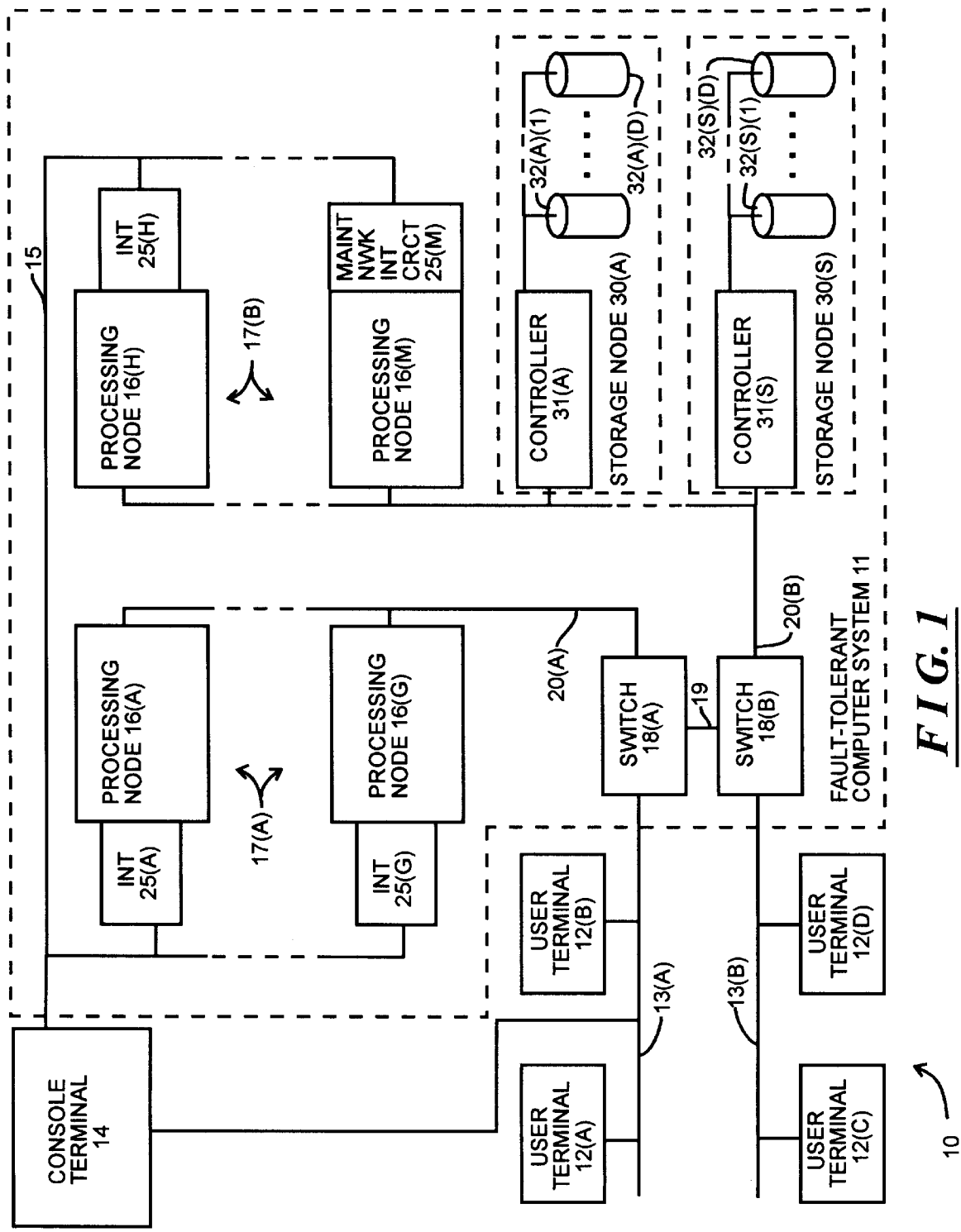
FIG. 1 is a functional block diagram of a digital computer system including a fault-tolerant computer system constructed in accordance with the invention.

FIG. 1 is a functional block diagram of a digital computer system 10 including a storage subsystem that is constructed in accordance with the invention. With reference to FIG. 1, the digital computer system 10 includes a fault-tolerant computer system 11 which connects to a plurality of user terminals 12(A) through 12(D) (generally identified by reference numeral 12(*d*)) over respective user networks 13(A) and 13(B) (generally identified by reference numeral 13(n)) which connect the user terminals 12(d) to the fault-tolerant computer system 11. The fault-tolerant computer system 11 performs conventional digital data processing and data retrieval and storage services that are generally typical of those performed by digital computer systems, in connection with processing, data retrieval and data storage requests provided thereto by the user terminals 12(d). As will be described below in greater detail, the fault-tolerant computer system 11 includes a number of subsystems which allow the data processing, storage and retrieval services to be provided in a manner which is tolerant of faults, failures and malfunctions therein. The digital computer system 10 further includes a console terminal 14, which connects to the fault-tolerant computer system 11 over a maintenance network 15 as well as over a user network 13(n).

The user terminals 12(d) used in the digital computer system 10 may comprise any of a number of devices which may be provided to enable the fault-tolerant computer system 11 to operate to perform data storage and processing operations. The detailed structures of the user terminals 12(d) will be generally determined by the specific types of operations to be performed by the digital computer system 10, and will not be described in detail. For example, in connection with a digital computer system 10 which may be used in, for example, a transaction processing system in a financial institution such as a bank or the like, user terminals may include conventional video display terminals or personal computers which include a keyboard through which a user may enter transaction data, a video display device which may display processed transaction data to a user, and may also include processing circuits for performing local processing. In connection with a digital computer system which may be used in a retail sale environment, user terminals may include point-of-sale terminals which may register payments and credits and changes in inventory during transactions. In connection with a digital computer system 10 used in controlling an industrial facility such as a factory, the user terminals 12(d) may also comprise video display terminals or personal computers which may enable an operator to control the facility as well as interfaces to the machines and the like that are used in the facility to control operations by the machines. In addition, in connection with a digital computer system 10 used in controlling operations of, for example, a telephone switching operation, at least some of the user terminals 12(d) may control operation of the telephone switching circuits to ensure that voice information is properly routed through the telephone system between the calling and called parties.

In addition to transferring requests from the user terminals 12(d) to the fault-tolerant computer system 11, the networks 13(n) may also download data from the fault-tolerant computer system 11 to the user terminals 12(d) for local processing by the user terminals 12(d) or for display to a user on a display terminal which may be provided with respective ones of the user terminal 12(d). In addition, the networks 13(n) may transfer data from the user terminals 12(d) to the fault-tolerant computer system 11 for processing or storage, and in addition may transfer data among the user terminals 12(d). In one embodiment, the networks 13(A) and 13(B) are each in the form of conventional high-speed (100 Mb/second) Ethernet networks, which transfer information in the form of messages. As is conventional in Ethernet networks, messages generated by one device connected to a network 13(A), 13(B) (that is, by a user terminal 12(d) or by the fault-tolerant computer system 11) contain information to be transferred, as well as an address which identifies the intended recipient or recipients of the information.

As noted above, the fault-tolerant computer system 11 includes a number of subsystems which allow the services to be provided in a manner which is tolerant of faults and malfunctions. In particular, the fault-tolerant computer system 11 includes a number of processing nodes 16(A) through 16M (generally identified by reference numeral 16(m)) and a storage subsystem comprising a plurality of storage nodes 30(A) through 30(S) (generally identified by reference numeral 30(s) which are divided into two groups 17(A) and 17(B) (generally identified by reference numeral 17(g)), with processing nodes 16(m) in each group 17(g) being connected to a respective switch 18(A) and 18(B) (generally identified by reference numeral 18(h)) over a respective network 20(A) and 20(B) (generally identified by reference numeral 20(k)). As with networks 13(n), networks 20(A) and 20(B) are each in the form of conventional high-speed (100 Mb/second) Ethernet networks, which transfer information in the form of messages, with each generated by a device connected to a network 20(k) (that is, by a processing node 16(m) or switch 18(h)) containing information to be transferred, as well as an address which identifies the intended recipient or recipients of the information.

In one embodiment, the processing nodes 16(m) and storage nodes 30(s) communicate over the networks 20(k) using the ISIS communications protocols, as described in, for example, Kenneth P. Birman, "Maintaining Consistency In Distributed Systems," Technical Report TR 91-1240 (November 1991), Cornell University Department of Computer Science, and references cited therein, and Kenneth P. Birman, "The Process Group Approach To Reliable Distributed Computing," (report dated Jan. 6, 1993), and references cited therein. The ISIS communications protocols provide, among other things, a mechanism for reliable transfer of information among nodes 16(m) and 30(s) connected to the networks 20(k), including transfer of information between pairs of nodes and from one node to a number of nodes, a mechanism for maintaining distributed databases consistent (so that they will all contain the same information), and mechanisms for determining when a node malfunctions or otherwise fails. Although the embodiment described herein makes use of the ISIS communications protocols in connection with the Ethernet network it will be appreciated that other protocols may be efficiently used in connection with other networks.

The switches 18(h) for the two groups 17(g), in turn, are interconnected by a link 19, and each switch 18(h) is connected to one of the networks 13(A) or 13(B). The processing nodes 16(m) perform the data processing services for the user terminals 12(d) as described above in connection with the fault-tolerant computer system 11, and the networks 13(n), switches 18(h) and networks 20(k) serve to transfer processing requests from the user terminals 12(d) to processing nodes 16(m) and storage nodes 30(s) which are to execute the request and return any data and status information that is to be returned from the processing nodes 16(m) executing the request to the user terminals 12(d). Similarly, the storage nodes 30(s) perform the data processing services for the user terminals 12(d) as described above in connection with the fault-tolerant computer system 11, and the networks 13(n), switches 18(h) and networks 20(k) serve to transfer storage and retrieval requests from the user terminals 12(d) and processing nodes 16(m) to the storage nodes 30(s) which are to execute the request and return any data and status information that is to be returned from the storage nodes 30(s) executing the request. The switches 18(A) and 18(B) control communication between networks 13(A) and 13(B), on the one hand, and the networks 20(A) and 20(B), on the other hand. In addition, the switches are interconnected to transfer processing and/or storage requests and returned data and storage information from devices connected to networks 13(A), 20(A) or 13(B), 20(B) that are connected to one switch 18(A), 18(B) to devices connected to networks 13(B), 20(B) or 13(A), 20(A) that are connected to the other switch 18(B), 18(A). Storage and processing requests are routed to specific processing nodes 16(m) and storage nodes 30(s) for processing by the specific nodes while they are functioning properly; however, if a malfunction occurs in a node to which a request is directed, requests normally directed to the malfunctioning node may be directed to other processing nodes for processing, thereby to provide fault-tolerant service to the user terminals 12(d).

As described in U.S. patent application Ser. No. 08/546, 347, filed on even date herewith in the names of John D. Service, et al., and entitled System Console For Fault Tolerant Computer System, (Atty. Docket No. STR-002), incorporated herein by reference (hereinafter, "the Service, et al., patent application"), in one embodiment, each processing node 16(m) is in the form of a conventional personal computer module (generally termed a personal computer "motherboard"), including a microprocessor and a main memory including both a read/write random-access ("RAM") memory used for the operating system program and applications programs and a read-only memory ("ROM") for storing initialization routines and basic input/output system ("BIOS") routines. In that embodiment, the processing nodes 16(m) utilize the Microsoft Windows-NT™ operating system program as the operating system program. The initialization routines are used to initialize the processing node 16(m) during power-up of the personal computer module and in response to a re-initialization request from the console terminal 14. In addition, the personal computer module includes a disk controller interface which may facilitate connection to a disk storage subsystem (not shown). Various interfaces are also provided on each personal computer module, including a video display interface, a keyboard interface and a mouse port interface are also provided on the personal computer module which, if the personal computer module were connected in a personal computer, would be connected to a video display, a keyboard and a mouse, respectively, to provide a visual output (in video form) to an operator (in the case of the video display) and to receive operator input (in the case of the keyboard and mouse). As used in the fault-tolerant computer system 11, the video display interface, a keyboard interface and a mouse port interface of the personal computer modules receive input from and provide output to the console terminal 14. In addition, the personal computer module includes a network interface 41(m) (see FIG. 2, not shown in FIG. 1) which connects the processing node 16(m) to the network 20(k) to enable the processing node to receive and respond to requests the network 20(n), and a maintenance network interface circuit 25(m) to enable the processing node to communicate over the maintenance network 15. The personal computer module may also include conventional serial and parallel ports. Furthermore, the personal computer module includes one or more "slots" which permit connection of expansion modules, in the form of printed circuit boards, to the personal computer module over a bus, which may comprise, for example, a conventional EISA, MCI, PCI, or other bus (not shown); in one embodiment, the maintenance network interface circuit comprises a "Server Monitor Module" ("SMM") sold by Intel Corporation.

In one embodiment, the console terminal 14 corresponds to the console terminal described in the aforementioned Service, et al., patent application. As in the Service, et al., patent application, the console terminal 14, under control of an operator, performs conventional console services for the processing nodes 16(m), including initialization of the respective nodes and monitoring of their operation. In addition, the console terminal 14 can perform initialization and monitoring operations in connection with the storage nodes 30(s). The console terminal can use the maintenance network 15 in connection with initialization of the fault-tolerant computer system 11, and after the system 11 is initialized it can use the networks 13(n) and 20(k) for communication with the processing nodes 16(m). In addition, the console terminal can, under control of an operator, perform console services in connection with the storage nodes 30(s), including initialization, information configuration and monitoring, using the networks 13(n) and 20(k).

The storage nodes 30(s) store data and other information for use by the processing nodes 16(m) and the user terminals 12(d) in their processing operations. (FIG. 1 depicts storage nodes 30(s) being connected only in section 17(B) to network 20(B), but it will be appreciated that storage nodes similar to storage nodes 30(s) will also preferably be connected in section 17(A) to network 20(A) to provide fault tolerance.) The other information which the storage nodes 30(s) may store may include, for example, programs which may be downloaded by the processing nodes 16(m) and user terminals 12(d) to be used in processing data. As shown in FIG. 1, each storage node 30(s) includes a storage controller 31(s), each of which is connected to one or more storage devices 32(s)(1) through 32(s)(D) (generally identified by reference numeral 32(s)(d). In one particular embodiment, the storage devices 32(s)(d) comprise, for example, conventional disk storage devices, although it will be appreciated that storage devices may be provide comprising conventional tape storage devices, CD-ROM devices and other types of devices for storing digital information. It will be appreciated that the various storage nodes 30(s) may include the same number of numbers of storage devices 32(s)(d), or they may include differing numbers of storage devices.

In accordance with the invention, the processing nodes 16(m) and storage nodes 30(s) are configured to provide for replication of data that is stored on the storage nodes in the fault-tolerant computer system 11 so that, in the event of a malfunction or other failure in connection with an individual storage device 32(s)(d), an entire storage node 30(s) is not available, or an entire group 17(g), a copy of the data on the unavailable storage device 32(s)(d), storage node 30(s) or group 17(g) is available on another storage device, storage node or group so that processing and data storage and retrieval operations can continue in a fault-tolerant manner. In addition, the storage nodes 30(s) are further configured to provide for recovery following correction of a malfunction or other failure, so that updated data that was generated while the devices, nodes or groups were unavailable, will be stored thereon after the malfunction or other failure is corrected. Furthermore, the storage nodes 30(s) are configured to provide for recovery without the necessity of assistance by the processing nodes 16(m), so that the processing nodes 16(m) will be fully available to perform processing operations in response to requests from the user terminals.

Figure 2:
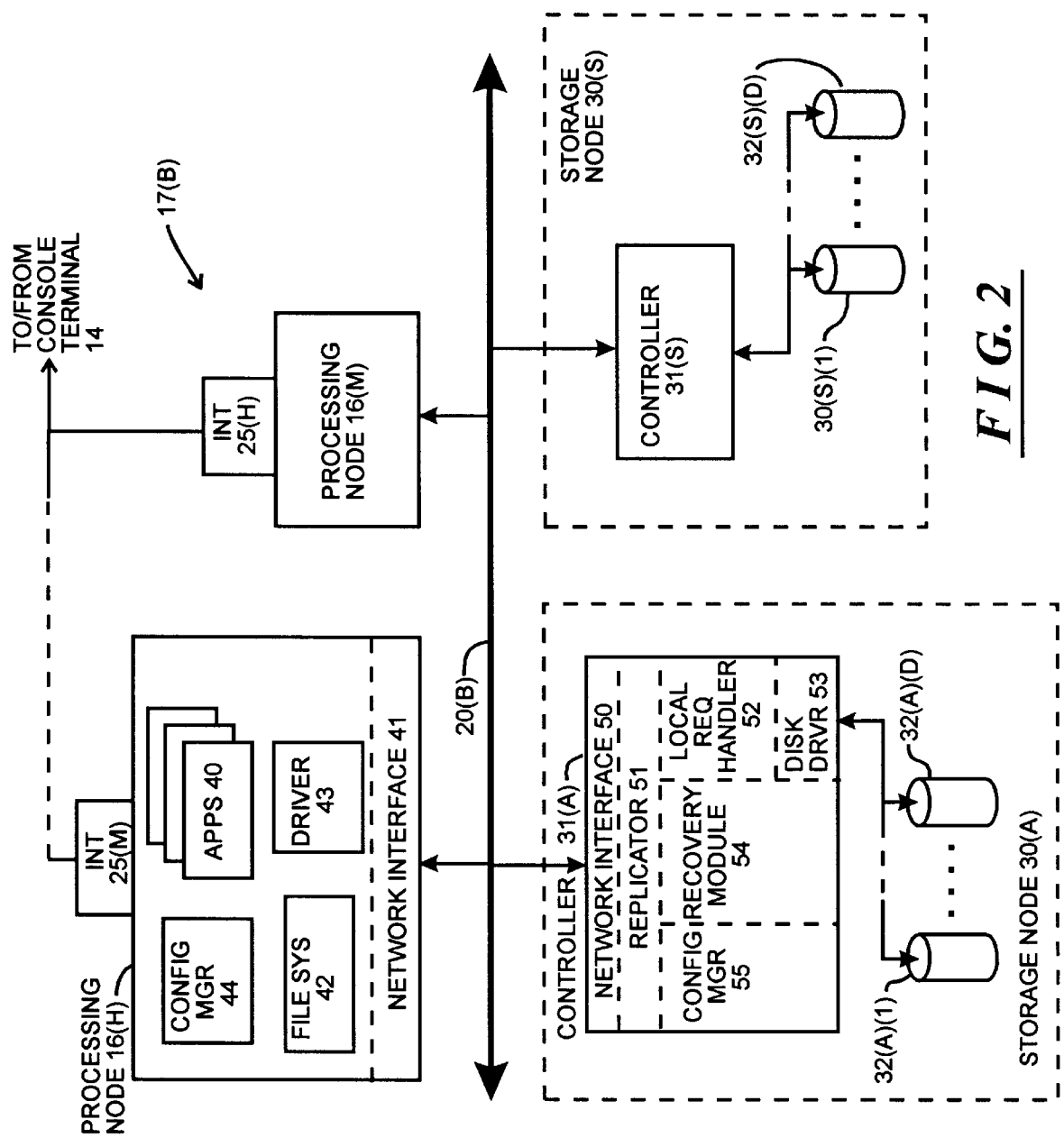
FIG. 2 is a functional block diagram of a portion of the fault-tolerant computer system depicted in FIG. 1, including details of a processing node and a storage node useful in understanding the invention.

The structure and operation of the storage nodes 30(s) will be described in detail in connection with FIGS. 2 through 7. FIG. 2 depicts a functional block diagram of a processing node 16(m) (in particular, processing node 16(H)) and a storage node 30(s) (in particular storage node 30(A)) constructed in accordance with the invention. By way of background, the fault-tolerant computer system 11 provides fault tolerance in connection with data storage by replicating disk partitions on each storage node 30(s) among a number of storage nodes(s). As is conventional, a disk partition comprises a set of one or more units, or blocks, of storage on one or more of the storage devices 32(s)(d), which will be replicated as a logical unit and recovered as a unit following correction of a malfunction or other failure. A storage node 30(s) may define a number of partitions, whose storage blocks may overlap so that the same block may be associated with a number of partitions. In one embodiment, preferably each partition will comprise storage blocks of storage devices 32(s)(d) within a single storage node 30(s), but will not extend across storage devices from a plurality of storage nodes 30(s). One or more disk partitions on diverse storage nodes 30(s) are aggregated together to form a replicated partition group, which will be replicated on each of the diverse storage nodes 30(s) so that all of the partitions in the replicated partition group contain the same information so that, in the event of a malfunction or failure in connection with any of the storage nodes 30(s) which maintain partitions in the replicated partition group, the partition can be recovered (that is, reconstructed) from the information maintained in the other partitions in the group. The particular storage nodes 30(s) and storage devices 32(s)(d) which will maintain partitions of a replicated partition group may be selected by an operator through the console terminal 14. It will be appreciated that limiting the extent of a partition to storage blocks within a single storage node 30(s) will simplify replication of partitions across a number of storage nodes 30(s), and also will simplify recovery of a partition following a malfunction or other failure in connection with a storage node 30(s) or storage device 32(s)(d).

All of the processing nodes 16(m) are generally similar, and only one processing node 16(H) will be described in detail in connection with FIG. 2. Similarly, all of the storage nodes 30(s) are generally similar and only processing node 30(A) will be described in detail. With reference to FIG. 2, processing node 16(H) includes a plurality of applications programs generally identified by reference numeral 40 that perform processing operations in response to processing requests received over network 20(B) through network interface 41. In performing processing operations, the applications program 40 may require data or other information which is stored on a storage node 30(s) and, when that occurs, may go through a file system 42 or directly through a driver 43 to issue a retrieval request for the required information. The particular storage node 30(A) to be accessed for the information is determined by a configuration manager 44 which, as will be described below in connection with FIGS. 3 and 4, maintains a record of the partitions on each storage node and storage nodes 30(s) as well as a record of the partitions on each storage node 30(s) which comprise each replicated partition group. In addition, the configuration manager 44 of each processing node 16(m) maintains a record of the states of all of the partitions in each replicated partition group, including whether the partitions are available or unavailable (which may be due to a malfunction or other failure, or for other selected reasons). In addition, the configuration manager 44 of each processing node 16(m) maintains a record, for each replicated partition group, of the identification of the partition which is selected as a "master partition" within the replicated partition group. The processing node 16(H) will, in response to a request from an applications program to retrieve data or other information in a particular partition within a replicated partition group, issue a retrieval request to retrieve the requested information from the storage node 30(s) whose partition in the replicated partition group is identified as the master partition. When the processing node 16(H) receives the requested information, it will normally be provided to the applications program 40 for processing.

At some point during processing, an applications program may need to store data or other information in a storage node 30(s). As with a retrieval operation described above, the applications program 40 may go through a file system 42 or directly through an appropriate driver 43 to issue a storage request to store the information. The particular storage node 30(A) to which the storage request will be issued is also determined by the configuration manager 44. In particular, the configuration manager 44 of each processing node 16(m) maintains a record, for each replicated partition group, of the identification of the partition which is selected as a "master partition" within the replicated partition group for storage operations. The processing node 16(H) will, when an applications program 40 needs to store data in a particular partition within a replicated partition group, issue a storage request to store the information on the storage node 30(s) whose partition in the replicated partition group is identified as the master partition.

As indicated above, the storage node 30(s) which maintains the "master partition" for a particular replicated partition group receives and executes the retrieval requests and storage requests from the processing nodes 16(m) over network 20(B). In executing a retrieval request, the storage node 30(s), in particular the controller 31(s), retrieves the required information from the storage devices 32(s)(d) and transmits the retrieved information over the network 20(B) to the requesting processing node 16(m). In addition, in executing a storage request received over the network, the controller 31(s) receives the information to be stored over network 20(B) and stores it on the appropriate storage device 32(s)(d), thereby to update the partition with the new information from the request. In addition, the controller 31(s) that receives a storage request from a processing node 16(m) will be responsible for transmitting partition update requests to storage nodes 30(s) maintaining other partitions of the replicated partition group so that all of the partitions in the replicated partition group contain consistent data.

The controllers 31(s) of the storage nodes 30(s) are all generally similar, and FIG. 2 depicts a general functional block diagram of the controller 31(A) of storage node 30(A). (A detailed functional block diagram of a controller 31(s) for a storage node 30(s), along with a detailed description of operations performed thereby, will be described below in connection with FIG. 7). As shown in FIG. 2, the controller 31(A) includes a network interface 50, a replicator module 51, a local request handler 52, a local disk driver 53, a recovery module 54 and a configuration manager 55. The controller's configuration manager 55 is generally similar to the configuration manager 44 of the processing node 16(H), and maintains records identifying the storage devices and blocks comprising each partition, the partitions comprising each replicated partition group, the status of each of the partitions in each replicated partition group and the identification of the master partition(s) in each replicated partition group. The controller 31(A) receives the storage and retrieval requests from the processing nodes 16(m) through its network interface 50, and in addition transmits responses therethrough. In addition, the controller 31(A) will transmit update requests for transmission to other storage nodes 30(s) to initiate updating of partitions within respective partition groups.

The storage controllers replicator module 51 receives the storage and retrieval requests from the network interface 50 and determines the type of request. If the replicator module determines that the request is a retrieval request, it will provide the request to the local request handler, which, in turn, will enable the disk driver 53 to initiate a retrieval operation in connection with a storage device 32(A)(d). After receiving the data requested in the retrieval request, the disk driver 53 will provide the data to the local request handler 52, which, in turn, enables the network interface 50 to transmit the information to the processing node 16(m) which issued the retrieval request over the network 20(B).

On the other hand, if the replicator module determines that a received request is a storage request, it will generate an update request for transmission through the network interface 50 to initiate update operations to enable storage of the data to be stored in other partitions in the replicated partition group. It will be appreciated that update operations need only be performed in connection with storage requests, since retrieval requests do not result in any changes in the contents of any of the partitions of the replicated partition group. The local request handler 52 generally receives retrieval, storage and update requests and initiates the actual retrieval and storage operations with the storage devices 32(s)(d) with the disk driver module 53. In addition, the local request handler will generate request acknowledgments for transmission over the network 20(B) to the processing node 16(m) that issued the storage or retrieval request. The timing of transmission of a request acknowledgment depends on a number of factors, which will be described below.

As indicated above, the storage node 30(s) that receives a storage request to initiate storage of data in a partition is the storage node which maintains the master partition of a replicated partition group, and that storage node generates update requests to initiate updating of other partitions in the replicated partition group. In one embodiment, the storage node 30(s) that receives a storage request does not actually operate to store the data requested to be stored in the storage request. Instead, the storage node 30(s) also issues the update request to itself, essentially broadcasting the update request over network 20(B) to all storage nodes which maintain members of the replicated partition group, and it will operate to store the data in response to the update request. This will ensure that all of the storage nodes 30(s) which maintain members of a replicated partition group will operate to update their partitions in the same manner, generally in response to update requests provided by the storage node 30(s) in response to a storage request from a processing node 16(m). The storage nodes 30(s) which receive the update requests will provide acknowledgments over the network 20(B) to the storage node 30(s) that broadcasted the update request, with a timing that depends on a number of factors as described below. The storage node 30(s) which received the storage request from a processing node 16(m) will provide an acknowledgment to the storage request after receiving acknowledgments from all of the storage nodes 30(s) to which it transmitted update requests.

The storage node 30(A) also includes the recovery module 54, which provides recovery services after correction of a malfunction or failure in connection with another storage node. In particular, if the corrected storage node maintains a partition which is a member of a replicated partition group, the recovery modules 54 of various storage nodes 30(s) which maintain members of the replicated partition group operate to help update the corrected storage node's partition so that it will be consistent with the other members of the replicated partition group. If the storage node 30(A) maintains a master partition, in the event of a malfunction or failure in connection with a storage node 30(s) which maintains another member of the replicated partition group, the recovery module 54 will maintain a recovery log, described below in connection with FIGS. 5 and 7, which may be used, with the contents of the partition, to recover the partition on the malfunctioning or failed storage node 30(s) when its malfunction or failure is corrected. The recovery log contains a record of storage requests received following a malfunction or other failure in connection with a storage node which maintains a partition other than the master partition, which can be used in recovering those partitions.

In addition, the replicator 51 of each storage node 30(s) maintains one or more replication broadcast logs 90 for each partition (described below in connection with FIGS. 6 and 7) which contains a record of certain update requests transmitted and received for the partition. The storage node 30(s) which maintains the master partition for a replicated partition group will have two replication broadcast logs 90 for the partition, one for update requests that are transmitted to storage nodes 30(s) which maintain other partitions for the replicated partition group and one which it maintains for update requests that it receives for the replicated partition group. The replication broadcast log maintained by the master partition's storage node 30(s) for transmitted update requests includes information for all of the update requests which were broadcast to storage nodes of other members of the replicated partition group for which update request acknowledgments have not been received. The replication broadcast log maintained by the storage nodes for received update requests includes information for all of the update requests from the oldest request in the master partition's transmitted update request transmitted request log to the update request most recently received by the storage node 30(s). The storage node 30(s) which broadcasts the update requests may, in each update request, provide the identification of the oldest request in the master partition's transmitted update request transmitted request log (which, as noted above, corresponds to the oldest update request which has not been acknowledged by all of the storage nodes 30(s) which maintaining the various members of the replicated partition group), which the storage nodes 30(s) may use in identifying update requests which should be removed from their received update request transmitted request logs.

Figure 5:
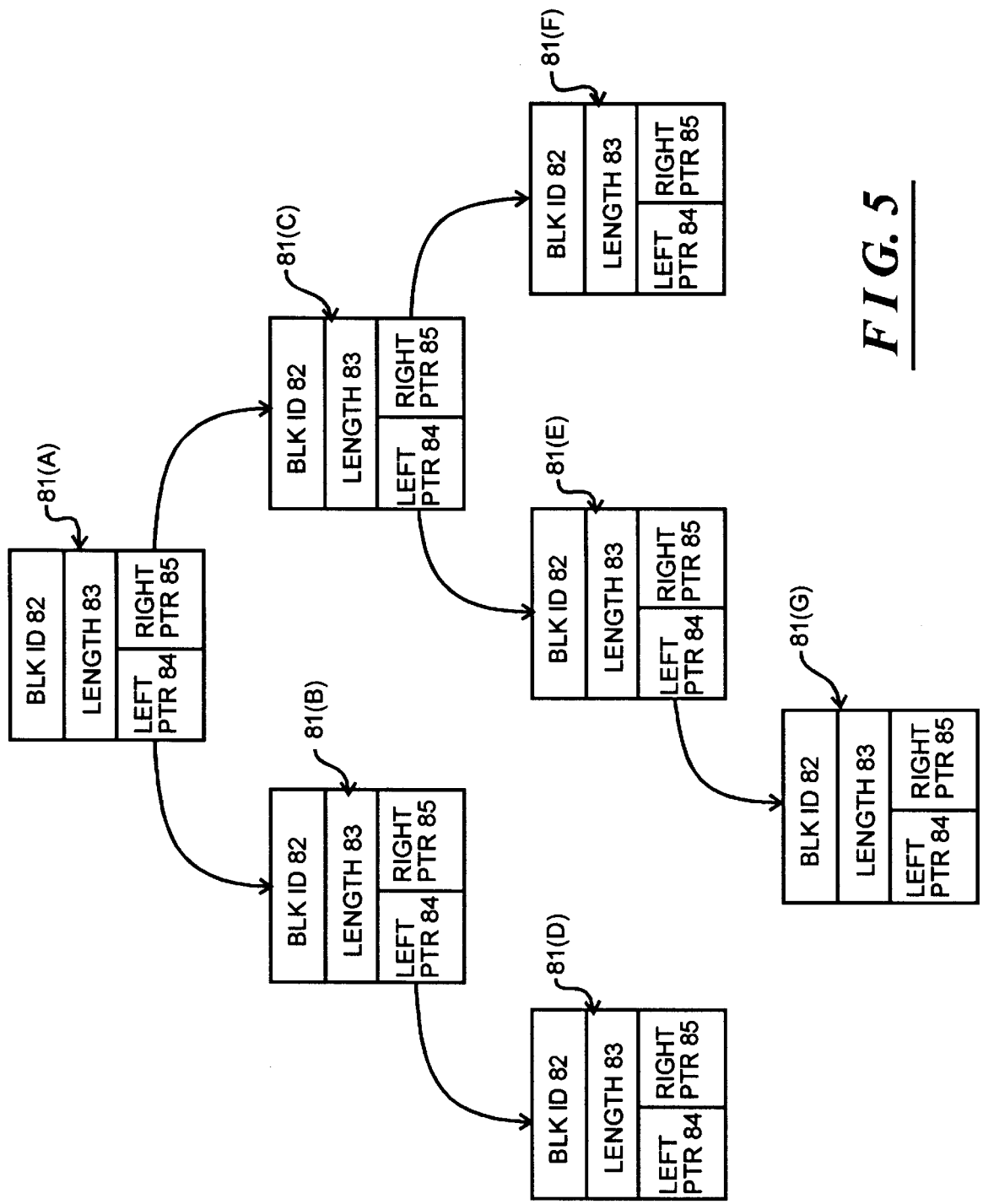
Figure 6:
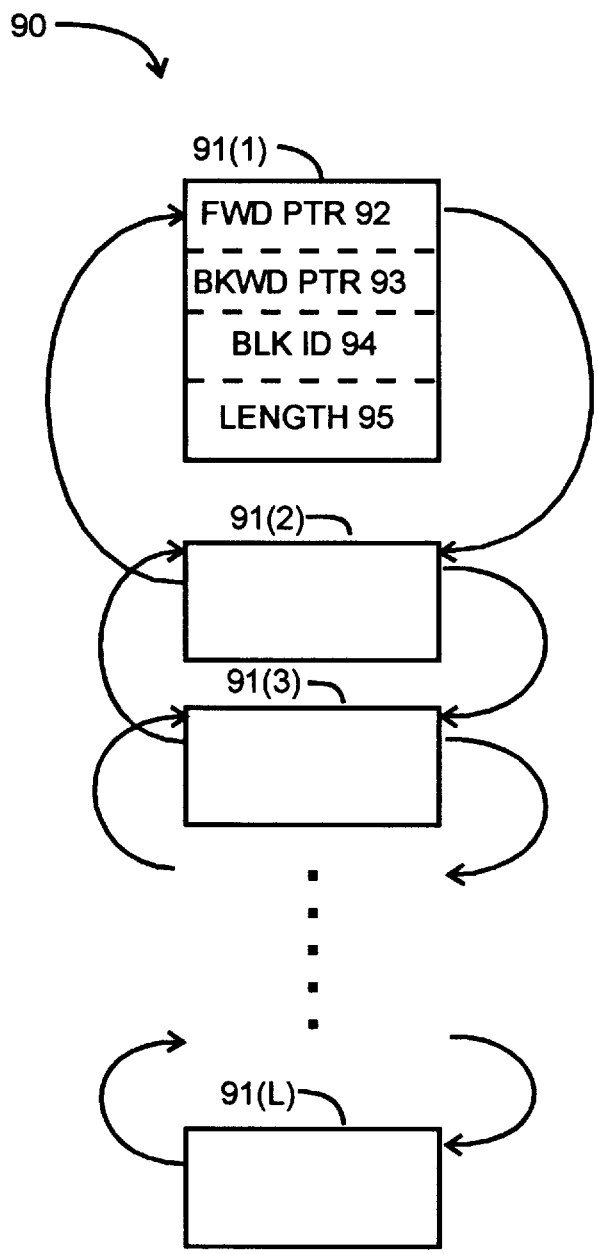

Before proceeding further, it would be helpful to describe data structures of the tables and logs which are used in connection with the invention. FIG. 3 depicts the structure of a partition table 60 which is maintained by the configuration managers 44 and 55 of both the processing nodes 16(m) and storage nodes 30(s) to identify the partitions maintained by each storage node storage node 30(s) in the fault-tolerant computer system 11. FIG. 4 depicts the structure of a replication table 70 which is maintained by the configuration managers 44 and 55 of both the processing nodes 16(m) to identify partitions on the various storage nodes 30(s) which are members of a replicated partition group and to identify the state of the partition and each of the partitions in the replicated partition group. FIG. 5 depicts the structure of a recovery log 80 which is maintained by the recovery module 54 of a storage node 30(s) for each partition for which the storage node maintains the master partition of a replicated partition group. Finally, FIG. 6 depicts the structure of a replication broadcast log 90 which contains a record of update requests transmitted or received for each partition until the partition has been updated on the storage device 32(s)(d). As will be apparent from the following, the partition tables 60 and replication tables 70 maintained by the configuration managers 44 and 55 of all of the processing nodes 16(*m*) and storage nodes 30(*s*) contain information as to the locations and states of all of the partitions and the respective replicated partition groups provided by the storage nodes 30(*s*), and thus preferably will all contain consistent information. The processing nodes 16(*m*) and storage nodes 30(*s*) will preferably use the ISIS communications protocols as described above to maintain the information in the partition tables 60 and replication tables 70 consistent. On the other hand, the storage nodes 30(*s*) may maintain recovery logs and replication broadcast logs on a replicated partition group-by-replicated partition group basis to provide for replication of a partition in a replicated partition group in the event of a malfunction or other failure, and need not be consistent across the storage nodes 30(*s*).

FIG. 3 depicts the structure of partition table 60 used in connection with one embodiment of the invention. With reference to FIG. 3, the partition table 60 includes a series of entries 61(0) through 61(P) (generally identified by reference numeral 61(*p*)), each of which comprises a plurality of fields. Each entry 61(*p*) describes a storage device extent which comprises either an entire partition or a portion of a partition; that is, each entry identifies the storage device 32(*s*)(*d*), the block on the storage device which is comprises the beginning of a partition, and the length, in, for example, bytes, of the series of successive blocks on the storage device which comprise the partition or portion of a partition. If a partition comprises a number of extents, that is, a number of disjoint (that is, non-successive) series of blocks on the same storage device 32(*s*)(*d*), the partition table 60 will include an entry 61(*p*) for each extent. In addition, if a partition comprises extents on diverse storage devices 32(*s*) (*d*), the partition table 60 will also include an entry for each extent. The first entry 61(*p*) in the table 60 associated with a partition (or the only entry 61 (*p*) if a partition is associated with only one entry) also contains partition identification information.

As noted above, each entry 61(*p*) includes a number of fields. In partition, each entry 61(*p*) includes a partition number field 62, a length field 63, a disk identifier field 64, a block field 65, a block count field 66 and a partition name field 67. The entry 61(*p*) for the first storage device extent of a partition contains partition identifiers in the partition number field 62 and the partition name field 67; in particular, the partition number fields 62(*p*) contain successive numerical values (which will identify the partition as the first, second, third and so forth, partition in the table) and the partition name fields contain textual names or handles which may be used by an applications program 40 to identify the partition. If the partition comprises a number of extents on a single storage device 32(*s*)(*d*) or a number of storage devices 32(*s*)(*d*), a series of entries 61(*p*) will be provided for the partition; in that case, the partition number field 62 and partition name field 67 of the first entry 61(*p*) of the series will contain non-null numerical and name values, and the other entries in the series will preferably be empty or contain null values. The length field 63 for the entry 61(*p*) for the first storage device extent of a partition contains a value which identifies the total length of the partition in, for example, bytes; if a series of entries 61(*p*) are provided for a partition, the length field 63 for the first entry 61(*p*) will contain a non-null length value and the other entries in the series will preferably be empty or contain null values.

The disk identifier field 64, block field 65 and block count field 66 of each entry 61(*p*) in the table 60 contain disk identifier, block identifier and block count values, respectively. The disk identifier field 64 contains a value identifying the storage device and the block identifier field 65 contains a value identifying the first block of the storage device extent for the entry 61(*p*), and the block count field 66 contains a value identifying the length in, for example, bytes, of the extent. It will be appreciated that the sum of the block count values in fields 66 of the entries 61(*p*) associated with a partition will correspond to the total length of the partition, which, in turn, corresponds to partition length value in the length field 63 of the first entry associated with the partition.

The structure of the replication table 70, which identifies the various partitions comprising each of the replicated partition groups, is depicted in FIG. 4. With reference to FIG. 4, the replication table 70 includes a number of entries 71(1) through 71(R) (generally identified by reference numeral 71(*r*)) each associated with a replicated partition group. Each entry 71(*r*), in turn, includes a replicated partition group identifier field 72, and a number of sub-entries 73(*r*)(1) through 73(*r*)(P) (generally identified by reference numeral 73(*r*)(*p*)). The first sub-entry 73(*r*)(1) contains state information which is applicable to the replicated partition group as a whole. The other sub-entries 73(*r*)(2) through 73(*r*)(P) each identifies one of the partitions in the replicated partition group, and in addition includes state information identifying the state of the partition identified in the sub-entry 73(*r*)(*p*).

Each sub-entry 73(*r*)(*p*) of a replication table entry 71(*r*) includes a number of fields, including an storage node identifier field 74, a partition number field 75 and a state field 76. For the first sub-entry 73(*r*)(1) of an entry 71(*r*), which contains only state information for the replicated partition group as a whole, the storage node identifier field 74 and partition number field 75 are empty, and the state field 76 contains state information, which will be described below. For the other sub-entries 73(*r*)(2) through 73(*r*)(P) of entry 71(*r*), which contain identifiers and state information for the partitions in the replicated partition group, the storage node identifier field 74 and partition number field 75 of a sub-entry 73(*r*)(*p*) together identify the storage node 30(*s*) and the partition on the storage node 30(*s*) which is the member of the replicated partition group associated with the sub-entry 73(*r*)(*p*). The value in the partition number field 75 corresponds to the partition number value in the partition number field 72 of the partition table 60 which describes the partition. The state field 76 of sub-entries 73(*r*)(2) through 73(*r*)(P) of entry 71(*r*) also contains state information, which will be described below.

As noted above, state field 76 of sub-entry 73(*r*)(1) of a replication table entry 71(*r*) contains state information for the replicated partition group as a whole. In one particular embodiment, the replication group can have one of five different states, including in use, not in use, changing write master, write-back and write through. It will be appreciated that the replicated partition group states are not necessarily mutually-exclusive, and a number of such states may be indicated for a replicated partition group. In addition, it will be appreciated that some of the states may be conditioned by the respective configuration managers 44 and 55 of the processing nodes 16(*m*) and storage nodes 30(*s*), and may also be conditioned by an operator using the console terminal 14. The in use state indicates that the replicated partition group is currently being accessed, that is, that a processing node 16(*m*) has issued a storage or retrieval request to the storage node 30(*s*) which maintains a partition (specifically, the partition which is the master partition) which is a member of the replicated partition group, which request has not been completed. The not-in-use state indicates that the replicated partition group is not currently being accessed.

The changing write master state indicates that the partition identified as the master partition in connection with storage requests is being changed. This may occur if, for example, a malfunction or other failure has occurred in connection with the storage node 30(*s*) which maintains the partition identified as the master partition in connection with storage requests. This may also occur for a number of other reasons, for example, for load balancing if that storage node 30(*s*) is over-burdened with requests while other storage nodes are generally not as busy. If a replicated partition group is indicated as being in the changing write master state, processing nodes 16(*m*) will preferably delay issuing storage requests until a new master partition is selected.

The write back and write through states identify when the storage node 30(*s*) will issue an acknowledgment to a storage node 30(*s*) following receipt of an update request. If the write back state is indicated, the storage node 30(*s*) will issue an acknowledgment after it receives the update request. On the other hand, if the write through state is indicated, the storage node 30(*s*) which receives the update request will issue an acknowledgment when it has actually stored the information on their respective storage devices 32(*s*)(*d*). Accordingly, since the storage node 30(*s*) which maintains the master partition will provide an acknowledgment to the storage request after receiving acknowledgments to all of the update requests which it generated in response to the storage request, if the write back state is indicated the storage node 30(*s*) will generate the storage request acknowledgment when all of the storage nodes 30(*s*) which maintain members of the replicated partition group have acknowledged receipt of the update requests. On the other hand, if the write through state is indicated, the storage node will generate the storage request acknowledgment when all of the storage nodes 30(*s*) which maintain members of the replicated partition group have actually stored the data to be stored on a storage device 32(*s*)(*d*).

As noted above, state field 76 of sub-entries 73(*r*)(2) through 73(*r*)(P) of a replication table entry 71(*r*) contains state information for the partition associated with the respective sub-entry. In one embodiment, the partitions can have a number of states, including normal, failed, invalid, needs-full-record, master, failed master, logging, recovery source and being recovered. It will be appreciated that the partition states are not necessarily mutually-exclusive, and a number of such states may be indicated for a partition. The normal state is used as a default state, in particular, when no other state is applicable. The master state identifies the partition as being the master partition at least in connection with storage requests; each processing node 16(*m*) will issue storage requests for partitions in the associated replicated partition group to the storage node 30(*s*) which maintains the partition which is identified as the master partition. If the storage node 30(*s*) which maintains the master partition is logging storage requests, which may occur if, for example, a malfunction or other failure has occurred in connection with a storage node 30(*s*) which maintains another member of the replicated partition group, the state field 76 will also identify the logging state.

Several states are used to identify malfunctions or other failures in connection with partitions. The failed master state is used to identifies a partition as being a master partition, for whose storage node 30(*s*) a malfunction or other failure has occurred. The failed state, which may also be used with partitions other than the master partition, indicates that a malfunction or other failure has been detected in connection with the storage node 30(*s*) which maintains the partition. The failed master state is used when the last member of a replicated partition group fails, and there are no other members of the group which can serve as master. The partition associated with the failed master state is the last master partition of the replicated partition group, and generally will be expected to contain the most valid data of all partitions in the replicated partition group. The invalid state is used in connection with a partition which is listed in the various tables, but for which there may be a discrepancy which renders the integrity of its information suspect.

Several of the states are used in connection with recovery of a partition. The being recovered state indicates that the partition is in the process of being recovered, using replicated information from other partitions in the replicated partition group. It will be appreciated that, if the storage node 30(*s*) of the partition being recovered had malfunctioned or failed for a brief time, so that most of its contents are intact and it only needs updates that had not been stored during that time, the partition may be efficiently recovered merely by providing the storage node 30(*s*) with the updates that it had missed. These updates may be provided from the recovery log 80 maintained by the storage node 30(*s*) which maintains the master partition, or alternatively if the malfunction or other failure occurs in connection with that storage node, from the replicated broadcast logs 90 maintained by the various storage nodes 30(*s*). The needs full recovery state, used in connection with a partition being recovered, indicates that the partition being recovered needs a full copy from another member of the replicated partition group. In addition, the recovery source state identifies the partition as the source for the recovery of the partition being recovered.

As noted above, FIG. 5 depicts the structure of a recovery log 80 which is maintained by the recovery module 54 of a storage node 30(*s*) for each partition for which the storage node maintains the master partition of a replicated partition group. The recovery log 80 contains information which may be used in connection with recovery of a partition in the replicated partition group after correction of a malfunction or other failure of the storage node 30(*s*) which maintains the partition, in particular a record of portions of the partition which are updated in response to storage requests received following a malfunction or other failure in connection with a storage node which maintains a partition other than the master partition. When a storage node 30(*s*) is generating a recovery log 80 in connection with a partition, the associated sub-entry 73(*r*)(*p*) in the replication table 70 so indicates with the "logging" state in the state field 76.

With reference to FIG. 5, the recovery log 80 comprises a plurality of log nodes 81(A) through 81(G) (generally identified by reference numeral 81(1)) organized in a tree. Each log node 81(1) identifies a portion of the partition that has been updated in response to a storage request. Each log node 81(1) includes a plurality of fields, including a block identifier field 82, a length field 83, a left pointer field 84 and a right pointer field 85. The left and right pointer fields 84 and 85 maintain the structure of the tree, for each node 81(1) pointing to the nodes 81($1_L$) and 81($1_R$) comprising left and right children, respectively, if the child nodes are present. If a node 81(1) does not have a left or right child node 81($1_L$) and 81($1_R$), the respective pointer field(s) will contain a null value. The block identifier field 82 and length field 83 identify the starting block and length (in, for example, bytes) of the portions of the partition which have been updated in response to storage requests received by the storage node 30(*s*) which maintains the partition.

The benefit of using a tree-structured recovery log 80 will be clear from the following. As noted above, the recovery log 80 in one embodiment stores records of the portions of the master partition which are updated in response to storage requests; it does not, however store records relating to the individual storage requests themselves. The tree structured recovery log 80 allows for the efficient identification of the specific portions of the master partition which have been updated in response to storage requests, but without identifying overlapping portions in multiple log nodes 81(1). This ensures that, when the recovery log 80 is used in recovering a partition the same portion of the partition will not be updated multiple times, which may occur if the storage node 30(s) were to merely maintain a list of the portions updated.

Thus, in response to the first storage request for the master partition after logging is commenced, the storage node 30(s) will establish the root log node 81(A), including the starting block identifier and length values in the respective fields 82 and 83. When the next storage request is received, the storage node 30(s) will determine whether the portion of the partition to be updated in response to the storage request is below or above the portion identified by the root node 81(A), or whether it overlaps the portion identified by the root node 81(A). If there is an overlap, the storage node 30(s) will adjust the starting block identifier and length values in fields 82 and 83 to identify both the original portion and the new portion as being updated in response to update requests.

On the other hand, if the storage node 30(s) determines that the portion to be updated in response to the newly-received storage request is above or below the portion identified by the root node 81(A), it will generate a new left or right child node 81(B) or 81(C). If the portion to be updated in response to the newly-received storage request is below the portion identified by root node 81(A), the storage node 30(s) will generate a left child node 81(B), including the starting block identifier and length values in respective fields 82 and 83 of that child node, and will update the left child pointer field 84 of the root node 81(A). On the other hand, if the portion to be updated in response to the newly-received storage request is above the portion identified by root node 81(A), the storage node 30(s) will generate a right child node 81(C), including the starting block identifier and length values in respective fields 82 and 83 of that child node, and will update the right child pointer field 85 of the root node 81(A).

For the next storage request received by the storage node 30(s), the operations performed by the storage node 30(s) will also be determined by whether the portion to be updated in response to the storage request overlaps the portion of the partition identified by the root node, or whether it is below or above the portion of the partition identified by the root node. If there is an overlap, the storage node 30(s) will also determine whether there is an overlap with either of the node's child nodes 81(B) or 81(C), and if so collapse the child nodes which there is an overlap, adjusting the values of the root node's block identifier and length fields 82 and 83 to identify the overlapping portions (that is, the portions identified by the nodes 81(A), 81(B) and/or 81(C) and the portion identified by the newly-received storage request). These operations will be repeated for each of the child nodes in the recovery log 80 down the tree, as long as there is an overlap.

On the other hand, if the storage node 30(s) determines at the root node 81(A) that there is no overlap of the portion identified by the root node and the portion to be updated in response to the newly-received storage request, it will determine whether the portion identified by the storage request is below or above the portion identified by the root node. If the storage node 30(s) determines that the portion identified by the root node is below the portion identified by the storage request, it will determine whether the portion identified by the storage request is above the portion identified by left child node 81(B), and if so, it will generate a new left child node for the root node and adjust the left pointers in fields 84 of the root node and new left child node to link the new left child node between the root node and the old left child node. On the other hand, if the storage node 30(s) determines that the portion identified by the root node is above the portion identified by the storage request, it will determine whether the portion identified by the storage request is below the portion identified by right child node 81(C), and if so, it will generate a new right child node for the root node and adjust the right pointers in fields 85 of the root node and new right child node to link the new right child node between the root node and the old right child node.

If the storage node 30(s)(i) determines that there is no overlap between the portion of the partition identified by the root node and the portion identified by the newly-received storage request, and (ii) if it does not generate a new left or right child node as described above, it will perform the same operations as described above in connection with the portion of the tree starting with the left or right child node 81(B) or 8(C). That is, if the storage node 30(s) determines that the portion of the partition to be updated in response to the newly-received storage request is below the portion identified by the root node, it will repeat the operations using the left child node. On the other hand, if it determines that the portion of the partition to be updated is above the portion identified by the root node, it will repeat the operations using the right child node. These operations will be performed successively down the tree until either the portions identified by the nodes have been updated based on overlapping of the respective portions, or the storage node 30(s) has generated a new node as described above. This will ensure that the nodes 81(1) of the recovery log 80 do not define overlapping partition portions, so that the log will facilitate the efficient recovery of a partition on a failed storage node.

As noted above, FIG. 6 depicts the structure of a replication broadcast log 90 which contains a record of update requests transmitted and received for each partition. As described above, the storage node 30(s) which maintains the master partition will maintain a replication broadcast log 90 for update requests that it broadcasts to the storage nodes which maintain the various members of the replicated partition group (including the master partition), which log will contain a record of update requests have been broadcast but which have not been acknowledged by all of the storage nodes to which update requests were broadcast. In addition, each storage node 30(s) which maintains a member of a replicated partition group (including the master partition) will maintain a replication broadcast log 90 for update requests that it receives for the partition, which log will contain a record of update requests which have been received, from the earliest update request which has not been acknowledged by all of the storage nodes to which update requests were broadcast. Since all of the storage nodes 30(s) maintain at least one replication broadcast log 90 in connection with update requests for a partition, not just the storage node 30(s) which maintains the master partition, the replication broadcast logs 90 may be used to recover any of the partitions following a malfunction or other failure, including the master partition.

With reference to FIG. 6, the replication broadcast log 90 is a first-in, first-out queue comprising doubly-linked list including a plurality of entries 91(1) through 91(L) (generally identified by reference numeral 91(1)). The double-linking of entries in the list allows for addition to entries at the beginning of the list, and removal of entries from anywhere in the list, in a conventional manner. Each entry 91(1) includes a number of fields, including a forward pointer field 92, a backward pointer field 93, a block identifier field 94 and a length field 95. The forward and backward pointer fields 92 and 93 essentially define the entries in the queue; in particular, the forward pointer field 92 of each entry 91(1) contains a pointer that points to the next entry 91(1-1) in the queue, and the backward entry field 91(1) contains a pointer that points to the previous entry 91(1-1) in the queue. The storage node 30($s$) may maintain pointers (not shown) to the first and last entries in the queue, and the backward pointer field 93 of the first entry 91(1) may point to the storage node's first entry pointer and the forward pointer field 92 of the last entry 91(L) may point to the storage node's last entry pointer. The block identifier field 94 and length field 95 of each entry 91(1) have the contents which are similar to contents of the block identifier field and length field of the recovery log 80; that is, they contain values which identify the starting block and length (in, for example, bytes) of the portions of the partition which are to be updated in response to update requests transmitted and/or received by the storage node 30($s$).

Figure 7:
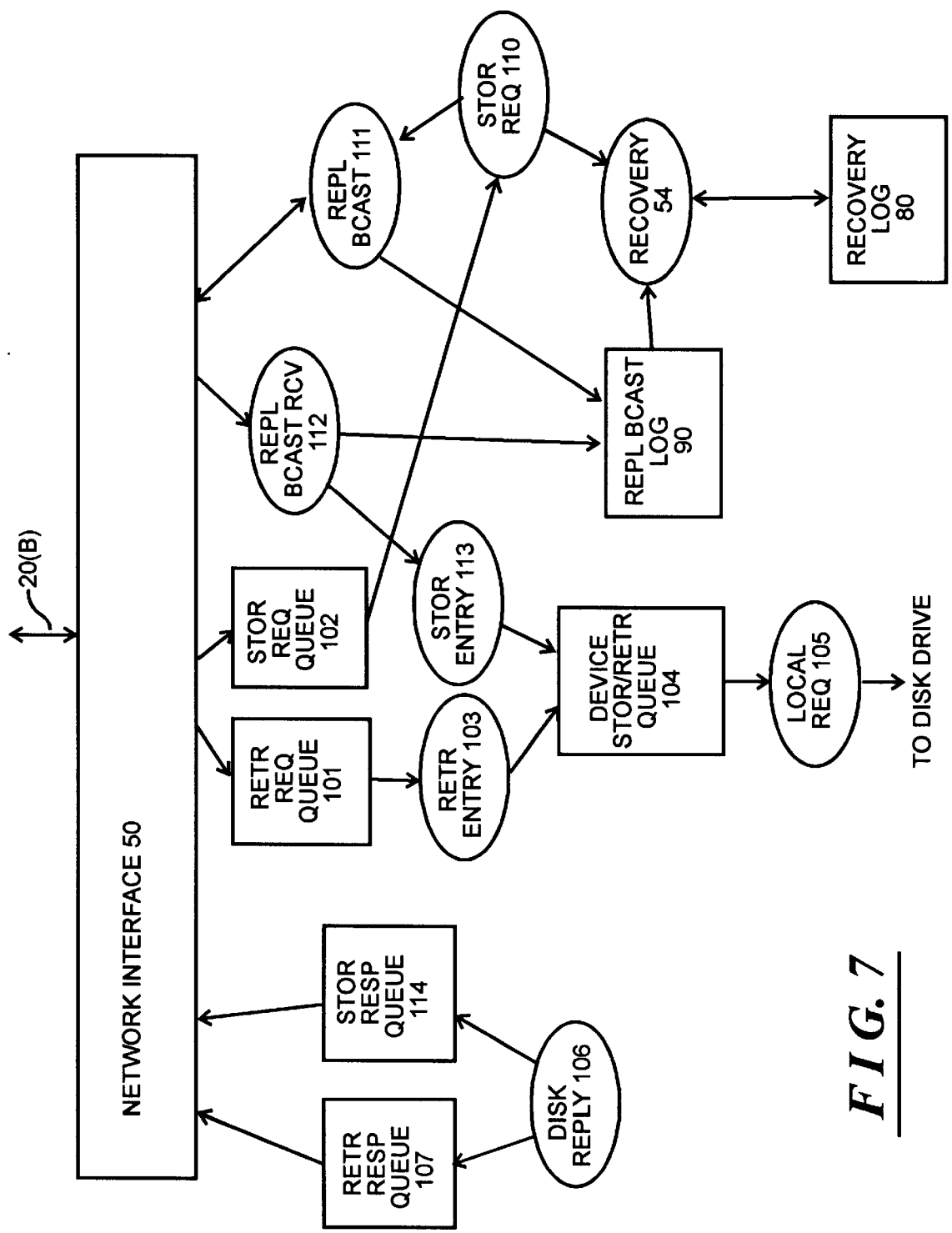
FIG. 7 depicts a detailed block diagram of the storage node depicted in FIGS. 1 and 2.

With this background, the operations performed by a storage node 30($s$) in connection with storage, retrieval and update requests will be described in connection with FIG. 7. In addition, operations performed by a storage node 30($s$) in connection with recovering from a malfunction or other failure will also be described in connection with FIG. 7. FIG. 7 depicts a detailed functional block diagram of the controller 31($s$). With reference to FIG. 7, the controller 31($s$) receives retrieval requests and storage requests over network 20(B) through its network interface 50. As noted above, if the controller 30($s$) receives a retrieval or storage request in connection with a particular partition, that partition is the master partition for a replicated partition group. In any case, the network interface 50 will direct retrieval requests which it receives to a retrieval request queue 101, and storage requests which it receives to a storage request queue 102, both of which form part of the replicator 51 described above in connection with FIG. 2. In addition, in accordance with the ISIS communication protocol, the network interface 50 may generate a network acknowledgment for transmission over the network to the processing node 16($m$) that generated the storage or retrieval request.

The retrieval request queue 101 buffers retrieval requests until they can be processed by a storage device retrieval entry generator 103, which forms part of the local request handler 52 described above in connection with FIG. 2. The storage device retrieval entry generator 103 generates a retrieval entry for a storage device 32($s$)($d$), which it loads into a device storage/retrieval queue 104, which forms an interface between the local request handler 52 and the disk driver 53 described above in connection with FIG. 2. The controller 51($s$) provides a disk storage/retrieval queue 104 for each of the storage devices 32($s$)($d$), and includes both retrieval and storage entries, which are generated as described below, and so the retrieval entry generator 103 will load the retrieval entry into the device storage/retrieval queue 104 for the appropriate storage device 32($s$)($d$). A local storage device request handler 105, which also forms part of the disk driver 53 described above in connection with FIG. 2, will retrieve retrieval and storage entries from the device storage/retrieval queue 104 and transfer them to the appropriate storage device for processing.

In response to a retrieval entry, a storage device 32($s$)($d$) will perform the retrieval operation required in the retrieval entry. If the storage device 32($s$)($d$) successfully performs the operation, it will provide the data, along with status information regarding the status of the operation, to the controller 31($s$), in particular to a disk reply module 106, which also forms part of the disk driver 53 described above in connection with FIG. 2. The disk reply module 106 will generate a request response, which includes the data and status information regarding the status of the retrieval operation, which it enqueues in a retrieval response queue 107. The retrieval response queue 107 forms part of the local request handler 52 described above in connection with FIG. 2. The network interface 50 handles dequeuing of the request responses from the retrieval response queue 107 and transfers them to the requesting processing nodes 16($m$) over the network 20(B). If a malfunction or other failure occurs in connection with the retrieval operation, either the storage device 32($s$)($d$) will provide status information indicating the malfunction, which the disk reply module 106 may use in generating a response; if the storage device 32($s$)($d$) is unable to provide the status information indicating the malfunction or other failure, the controller 31($s$) itself may provide the required information, which the disk reply module 106 may use in generating a request response.

As noted above, the network interface 50 loads storage requests received over the network 20(B) into the storage request queue 102. Unlike retrieval requests, storage requests will result in updating of the information stored in the partition which is the target of the storage request, and the replicator 51 (FIG. 2) of the controller 31($s$) which receives the storage request will be responsible for enabling storage nodes 30($s$) which maintain other partitions in the replicated partition group to update their partitions as well. Accordingly, the replicator 51 is provided with a storage request handler 110 which receives storage requests from the storage request queue 102 and provides them to a replication broadcast transmission module 111, which enables the network interface 50 to broadcast the storage request as an update request to all of the storage nodes 30($s$) which maintain members of the replicated partition group. As described above, the replication broadcast transmission module 111 and network interface 50 will perform the broadcast using the ISIS communications protocols. In accordance with the ISIS communication protocol, the network interfaces 50 of the storage nodes 30($s$) which receive the messages will be expected to generate a network acknowledgment for transmission over the network to the storage node 30($s$) that generated the update request, and the network interface 50 will monitor the network 20(B) to verify that update requests for all of the storage nodes 30($s$) have been received.

It will be appreciated that the replication broadcast transmission module 111 can determine the identifications of the various storage nodes which maintain members of the replicated partition group from the replication table 70 maintained by the configuration manager 55 (FIG. 2). Since the storage node 30($s$) that receives the storage request is the storage node 30($s$) which maintains the master partition for the replicated partition group, the replication broadcast transmission module 111 will also generate an entry 91(1) for the replication broadcast log 90 which is maintained by the storage node 30($s$) for update requests which it transmits for the replicated partition group.

If the partition is in the "logging" state, as indicated by an appropriate entry in the partition state field 75 of the sub-entry 72($r$)($p$) for the partition in the replication table 70, the storage request handler 110 also enables the recovery module 54 to generate an entry 81(1) for the recovery log 80 for the storage request as described above.

The storage node 30(s) receives update requests from the network 20(B), including both update requests generated by the storage node 30(s) itself and update requests generated by other storage nodes 30(s). The network interface 50 will generate a network acknowledgment for transmission over the network 20(B) to the storage node 30(s) which generated the update request. In addition, the network interface 50 will provide the update requests to a replication broadcast receive module 112, which also forms part of the replicator 51 described above in connection with FIG. 2. The replication broadcast receive module 112 will provide the update request to a storage entry generator module 113 (which forms part of the local request handler 52 described above in connection with FIG. 2) that generates a storage entry for storage in the storage device storage/retrieval request queue 104 for the appropriate storage device, which will be handled by the local request handler 105 as described above. In addition, the replication broadcast receive module 112 will also generate an entry 91(1) for the replication broadcast log 90 which is maintained by the storage node 30(s) for update requests which it receives for the replicated partition group.

As noted above, the local storage device request handler 105 will retrieve entries from the disk storage/retrieval queue 104, including the storage entries generated by the storage entry generator module 113 and transfer them to the appropriate storage device 32(s)(d) for processing. The storage entry will include the data to be stored, and in response to a storage entry, a storage device 32(s)(d) will store the data in the partition where indicated in the partition. After the storage device 32(s)(d) has completed the storage operation, it will generate a response indicating, for example, the success or failure status of the operation.

At some point during processing of a storage request, the disk reply module 106 will generate an acknowledgment, which it will load into a storage response queue 114, which forms part of the local request handler 52 described above in connection with FIG. 2. The network interface 50 handles dequeuing of the responses from the storage response queue 114 and transfers them to the processing nodes 16(m) which generated the requests over the network 20(B). The particular point in the processing at which the disk reply module 106 generates the acknowledgment will be determined by whether the partition being updated is in the write-back state or the write-through state, as indicated by an appropriate entry in the partition state field 75 of the sub-entry 72(r)(p) for the partition in the replication table 70 as described above. If the partition is in the write-back state, the disk reply module 106 will generate an acknowledgment to indicate receipt of the storage request, but if the partition is in the write through state the disk reply module 106 will wait until it receives a response from the storage device 32(s)(d) before generating the acknowledgment.

As noted above, the various partitions of a replicated partition group may be used in connection with recovery of a partition on a storage node 30(s) which has malfunctioned or otherwise failed. The configuration managers 44 and 55 of the respective processing nodes 16(m) and storage nodes 30(s), along with the replicators 51 of the respective storage nodes 30(s) determine whether a malfunction or other failure has occurred which may require logging and, if the malfunction or other failure occurred in connection with the master partition, selection of a new master partition. The configuration manager 44 of a processing nodes may detect a malfunction or other failure in connection with a storage node 30(s) if it, for example, transmits a storage or retrieval request thereto and fails to receive either a network acknowledgment or a request response as described above. The replicator 51 of a storage node 30(s) can determine when a malfunction or other failure has occurred from a number of indicia, including, for example, (i) if the storage node 30(s) maintains a master partition, if it fails to receive a network acknowledgment from a storage node in response to an update request in connection with the replicated partition group;

(ii) if an error is detected in connection with one of its storage devices 32(s)(d) or its disk driver 53, (iii) it detects a change is detected in its copy of the recovery table 70 indicating an error or other malfunction, (FIG. 4); and (iv) if the storage node 30(s) maintains a master partition, if it receives a failure notification from the configuration manager 55 of its storage node 30(s), which may result from a malfunction or other failure in connection with another storage node 30(s).

The storage nodes 30(s) will perform a number of operations in response to these indicia. In particular, their configuration managers 55, along with the configuration managers 44 of the processing nodes 16(m), will update their recovery tables 70 to indicate the change in status of the partition on the malfunctioning or failed storage node 30(s). In addition, the replicators 51 of the storage nodes 30(s) which maintain members of the affected replicated partition group will initiate logging, in particular enabling establishment of the respective replication broadcast log(s) 90 (FIG. 6) and, if the storage node 30(s) maintains a master partition, will enable the recovery module 54 to establish the recovery log 80 (FIG. 5).

Furthermore, if the malfunction or failure occurred in connection with a storage node 30(s) which maintains a master partition of a replicated partition group, the configuration managers 44 and 55 of the processing nodes 16(m) and storage nodes 30(s) will select a new master partition and update their recovery logs 80 accordingly. In that operation, when a configuration manager 44 or 55 detects a malfunction or other failure in connection with a master partition, it (the configuration manager) will condition the partition state field 75 of the associated sub-entry 72(r)(1) of the entry 71(r) of the replication table 70 for the associated replicated partition group to indicate the changing write master and changing read master states. If the configuration manager which performs this operation is the configuration manager 44 of a processing node 16(m), this will inhibit the processingnode 16(m) from transmitting storage or retrieval requests for the partition until a new master partition is selected. In addition, the configuration manager will broadcast a "changing master" message over the network 20(B) using the ISIS protocol, to enable the configuration managers of the other processing nodes and storage nodes to also condition their replication tables 70 for the replicated partition group to indicate the changing write master and changing read master state, which, in turn, disables all of the processing nodes 16(m) from transmitting storage or retrieval requests for the partition until a new master partition is selected.

Thereafter, the configuration manager 44 or 55 which detected the malfunction or other failure will use the replication table 70 to select a new master partition. In selecting the new master partition, the selecting configuration manager may use any selection algorithm; in one embodiment, the new master partition is the next partition in the replication table 70 which is indicated as being in the "normal" state. In addition, the partition state field of the sub-entry 72(r)(p) associated with the former master partition will be indicated as being in the "failed" state. After selecting a new master partition, the selecting configuration manager will broadcast a message to the other configuration managers identifying the new master partition. All of the configuration managers will update their replication tables 70 to indicate the new master partition cancel the "changing write master" and "changing read master" states for the replicated partition group, and the processing nodes 16(m) can thereafter transmit retrieval and storage requests to the storage node 30(s) which maintains the new master partition.

In one embodiment, the master partition can also be changed for a number of reasons in addition to detection of a malfunction or other failure. For example, the storage node 30(s) which maintains the master partition may voluntarily withdraw from the replicated partition group, and an operator, through, for example, the console terminal 14, may force a change in the master partition. When that occurs, the configuration managers operate generally as described above to select a new master partition and update their replication tables 70 accordingly.

As noted above, if a malfunction or other failure occurs in connection with a storage node 30(s) which maintains a member of a replicated partition group, the storage node which maintains the master partition will begin a recovery log 80, which, with the replication broadcast logs 90, may be used to recover the partition following recovery of the malfunctioning or failed storage node 30(s). If the malfunction or other failure is corrected, or if a storage node 30(s) or storage device 32(s)(d) is substituted for the malfunctioning or failed storage node 30(s) or storage device 32(s)(d), the contents of one or more of the other partitions and the respective replication broadcast logs 90 and recovery logs 80 can be used in recovering the partition on the previously-malfunctioning or -failed storage node 30(s). Indication that a malfunction or other failure has been corrected, or substitution of a storage node or storage device, may be provided by an operator through the console terminal 14.

In one embodiment, the storage node 30(s) which maintains the master partition (even if it is a new master partition) performs recovery. The storage node 30(s), in particular its recovery module 54, performs recovery by copying some or all of the master partition to the storage node which maintains the partition being recovered over the network 20(B). The actual operations performed in connection with recovering a partition depend on a number of factors, including whether the partition being recovered was the previous master partition or another member of the replicated partition group, and whether the partition being recovered was a member or was newly-added to the replicated partition group (which may occur if, for example, a storage node 30(s) or storage device 32(s)(d) is substituted for a previous node or device). In addition, if the malfunctioning or failed storage node was the storage node 30(s) which maintained the master partition, operations will depend on whether the new master partition was a member of the replicated partition group for a sufficient period of time to have a replicated broadcast log 90 to support recovery; in particular whether its replicated broadcast log 90 contains entries from the oldest unacknowledged update request broadcast by the previous master partition.

If the partition being recovered is a new partition, or if the new master was not a member of the replicated partition group for a sufficient period of time, the recovery module 54 of the storage node 30(s) which maintains the new master partition will not recover the partition from the replication broadcast log 90, but instead will copy its entire partition to the partition being recovered. Prior to beginning recovery, the recovery module will preferably ensure that outstanding update requests, which are listed in its replication broadcast log 90 at the time recovery begins, are executed, since the storage node 30(s) of the partition being recovered will not have received the update requests.

If the partition being recovered is not a new partition, and if the master partition is not a new master partition (that is, the malfunctioning or failed storage node 30(s) was not the storage node which maintained the master partition), the recovery module 54 of the storage node may recover the partition using the recovery log 80. The recovery module 54 may step down the tree-structured recovery log 80 copying the various portions of the master partition identified in the recovery log 80 to the partition being recovered. Since the recovery log 80 identifies disjoint (that is, non-overlapping) portions of the master partition, the recovery module 54 can efficiently recover the partition.

Finally, if (i) the partition being recovered is not a new partition and (ii) the master partition is a new master partition (which may occur if the malfunctioning or failed storage node 30(s) was the storage node which previously maintained the master partition) which has been a master partition for a sufficient period of time that its replicated broadcast log 90 contains entries from the oldest unacknowledged update request broadcast by the previous master partition, the recovery module 54 of the storage node 30(s) which maintains the new master partition will use its replication broadcast log 90 to perform recovery. The recovery module 54 will copy the portions of the master partition identified by the sequence of the entries 91(1) in its replicated broadcast log 90 to the partition being recovered. It will be appreciated that a plurality of entries 91(1) in the log 90 may relate to overlapping portions of the partition, and so portions of the partition will be copied in the order of the entries 91(1) in the log 90.

It will be appreciated that, during recovery, the storage node 30(s) which maintains the master partition may receive a storage or retrieval request from a processing node 16(m) in connection with the partition. Since a retrieval request will not result in a change to the contents of the partition, it can perform the retrieval request while it is performing recovery operations. However, since a storage request will result in a change to the contents of the partition, the recovery module 54 and the replication module 51 of the storage node 30(s) of the master partition will cooperate to delay operations in connection with the storage request, if the storage request relates to a portion of the master partition which overlaps a portion which is to be copied to the partition being recovered, until after portion has been copied. After the recovery module 54 has copied the portion of the master partition to the partition being recovered, it (the recovery module 54) will broadcast update requests for the storage request to storage nodes 30(s) which maintain the other members of the replicated partition group.

It will be appreciated that the invention provides a number of advantages. In particular, it provides a fault-tolerant computer system which includes a distributed, fault-tolerant storage subsystem in which information is replicated in a convenient manner, and that will quickly recover replicated data following correction of a malfunction or other failure, without the need of processor node intervention. Thus, processing by the processor nodes can continue without degradation in connection with data which is not stored on a malfunctioning or failing storage node, and possibly with only some degradation in connection with data which is stored on the malfunctioning or failing storage node.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. A fault-tolerant computer system comprising at least one processing node and a plurality of storage nodes interconnected by a network;
   A. the processing node performing processing operations in connection with user-generated processing requests, in connection with processing a processing request generating storage and retrieval requests for transmission over the network to enable storage of data on and retrieval of data from respective ones of said storage nodes;
   B. the storage nodes storing data in at least one replicated partition group comprising a plurality of replicated partitions distributed across the storage nodes, one of said replicated partitions of said at least one replicated partition group comprising a master partition and each other replicated partition of said at least one replicated partition group comprising a respective slave partition, each said storage node on receiving a retrieval request from said processing node providing the requested data to the processing node, and said storage node which maintains the master partition on receiving a storage request from said processing node initiating an update operation in connection with the storage nodes which maintain said replicated partitions to update all of the replicated partitions in the replicated partition group in the same manner.

2. A fault-tolerant computer system as defined in claim 1 in which said processing node directs retrieval requests to the one of said storage nodes which maintains the master partition.

3. A fault-tolerant computer system as defined in claim 1 in which said processing node directs storage requests to the one of said storage nodes which maintains the master partition.

4. A fault-tolerant computer system as defined in claim 1 comprising a plurality of processing nodes, each processing node performing processing operations in connection with user-generated processing requests, in connection with processing a processing request generating storage and retrieval requests for transmission over the network to enable storage of data on and retrieval of data from respective ones of said storage nodes.

5. A fault-tolerant computer system as defined in claim 1 in which the one of said storage nodes which maintains the master partition comprises:
   A. a network interface for receiving storage requests from said network, the network interface further receiving replicated storage requests directed to the one of said storage nodes which maintains the master partition;
   B. a replicator module for receiving storage requests from said network interface and broadcasting replicated storage requests to the storage nodes which maintain ones of the replicated partitions of the replicated partition group;
   C. a local request handler for said receiving replicated storage requests directed to the one of said storage nodes which maintains the master partition, and in response thereto updates the master partition.

6. A fault-tolerant computer system as defined in claim 5 in which the storage nodes to which replicated storage requests are broadcast includes the one of the storage node nodes which maintains the master partition.

7. A fault-tolerant computer system as defined in claim 5 in which said replicator module comprises:
   A. a storage request queue for receiving and enqueuing storage requests from said network interface;
   B. a replicated storage request broadcast module for retrieving enqueued storage requests from said storage request queue and generating retrieved storage requests for broadcast to the storage nodes which maintain ones of the replicated partitions of the replicated partition group.

8. A fault-tolerant computer system as defined in claim 7 in which the replicator module further comprises a replicated broadcast log, the replicated storage request broadcast module enabling the replicated broadcast log to maintain a record of the replicated storage requests broadcast by the replicated storage request broadcast module.

9. A fault-tolerant computer system as defined in claim 8 in which the replicator module further includes a replicated storage request receiver module for receiving the replicated storage requests from the network interface and for providing the received replicated storage requests to the local request handler.

10. A fault-tolerant computer system as defined in claim 9 in which the replicated storage request receiver module further generates an acknowledgment for transmission by the network interface to the one of the storage nodes which maintains the master partition.

11. A fault-tolerant computer system as defined in claim 9 in which in which the replicator module further comprises a replicated broadcast log for maintaining a record of the replicated storage requests broadcast by the replicator module, the replicated broadcast log removing the records of replicated storage requests for which acknowledgments have been received from all of the storage nodes which maintain replicated partitions of said replicated partition group.

12. A fault-tolerant computer system as defined in claim 10 in which the replicated storage request receiver module operates in a write-through mode, in which it generates said acknowledgment to said replicated storage request when the one of the replicated partitions of the replicated partition group maintained thereby has been updated in response to the replicated storage request.

13. A fault-tolerant computer system as defined in claim 10 in which the replicated storage request receiver module operates in a write-back mode, in which it generates said acknowledgment to said replicated storage request when the replicated storage request has been received.

14. A fault-tolerant computer system as defined in claim 5 further comprising a recovery module for providing recovery services after correction of a malfunction in connection with another of said storage nodes which maintains one of said replicated partitions of said replicated partition group to update the other storage node's replicated partition so that it will be consistent with the other replicated partitions of the replicated partition group.

15. A fault-tolerant computer system as defined in claim 14 further comprising a recovery log maintained by said recovery module after said other of said storage nodes has malfunctioned, the recovery log maintaining a record of portions of the replicated partition which are updated during a malfunction period.

16. A fault-tolerant computer system as defined in claim 15 in which said recovery module, after correction of the malfunction in connection with the other storage node, uses the recovery log to facilitate updating of the replicated partition on the other storage node.

17. A fault-tolerant computer system as defined in claim 15 in which the recovery log comprises a plurality of entries organized in a tree, each entry identifying one of said portions of said master partition.

18. A fault-tolerant computer system as defined in claim 17 in which:
   A. each of said portions is associated with a block identifier and a length, the block identifier identifying a storage block on which said portion of the master partition is stored on said one of said storage nodes;
   B. said tree includes a plurality of entries each identifying a one of said portions of the master partition updated during the malfunction period, the entries identifying non-overlapping portions of said master partition, one of said entries comprising a root entry associated with a first of said portions of the master partition updated during the malfunction period, and each of said other entries comprising a respective "lower" or "higher" child entry defining a respective one of said portions of the master partition updated during the malfunction period whose block identifier is respectively lower or higher than the block identifier of its respective parent entry.

19. A fault-tolerant computer system as defined in claim 18 in which said recovery module generates entries for the recovery log in response to receipt of replicated storage requests during the malfunction period.

20. A fault-tolerant computer system as defined in claim 19 in which, in response to receipt of a first one of said replicated storage requests during the malfunction period, the recovery module generates said root entry.

21. A fault-tolerant computer system as defined in claim 20 in which, in response to receipt of each subsequent replicated storage request during the malfunction period, the recovery module selectively generates a new entry or updates selected existing ones of entries so as to provide that the entries of said tree identify non-overlapping portions of said master partition.

22. A fault-tolerant computer system as defined in claim 1 in which at least one of said storage nodes which maintains at least one slave partition comprises:
   A. a network interface for receiving replicated storage requests broadcast by the one of said storage nodes which maintains the master partition;
   B. a replicator module including a replicated storage request receiver module for receiving the replicated storage requests from the network interface and for providing the received replicated storage requests to a local request handler;
   C. the local request handler, in response to replicated storage requests directed to the one of said storage nodes which maintains the respective one of said slave partitions, and updating the respective one of said slave partitions.

23. A fault-tolerant computer system as defined in claim 20 in which the replicated storage request receiver module further generates an acknowledgment for transmission by the network interface to the one of the storage nodes which maintains the master partition.

24. A fault-tolerant computer system as defined in claim 23 in which the replicated storage request receiver module operates in a write-through mode, in which it generates said acknowledgment to said replicated storage request when the one of the replicated partitions of the replicated partition group maintained thereby has been updated in response to the replicated storage request.

25. A fault-tolerant computer system as defined in claim 23 in which the replicated storage request receiver module operates in a write-back mode, in which it generates said acknowledgment to said replicated storage request when the replicated storage request has been received.

26. A fault-tolerant computer system as defined in claim 22 in which the at least one of said storage nodes further comprises a recovery module for providing recovery services after correction of a malfunction in connection with another of said storage nodes which maintains one of said replicated partitions of said replicated partition group to update the other storage node's replicated partition so that it will be consistent with the other replicated partitions of the replicated partition group.

27. A fault-tolerant computer system as defined in claim 26 in which the replicator module further comprises a replicated broadcast log, the replicated storage receiver broadcast module enabling the replicated broadcast log to maintain a record of the replicated storage requests received by the replicated storage request receiver module, the recovery module using the replicated broadcast log in providing the recovery services.

28. A storage node for use in connection with a fault-tolerant computer system comprising at least one processing node and a plurality of storage nodes interconnected by a network, the processing node performing processing operations in connection with user-generated processing requests, in connection with processing a processing request generating storage and retrieval requests for transmission over the network to enable storage of data on and retrieval of data from respective ones of said storage nodes, the storage nodes storing data in at least one replicated partition group comprising a plurality of replicated partitions distributed across the storage nodes, one of said replicated partitions of said at least one replicated partition group comprising a master partition and each other replicated partition of said at least one replicated partition group comprising a respective slave partition, the storage node maintaining the master partition and comprising:
   A. a network interface for receiving storage requests from said network, the network interface further receiving replicated storage requests directed to the one of said storage nodes which maintains the master partition;
   B. a replicator module for receiving storage requests from said network interface and broadcasting replicated storage requests to the storage nodes which maintain ones of the replicated partitions of the replicated partition group;
   C. a local request handler for said receiving replicated storage requests directed to the one of said storage nodes which maintains the master partition, and in response thereto updating the master partition.

29. A storage node as defined in claim 28 in which said replicator module comprises:
   A. a storage request queue for receiving and enqueuing storage requests from said network interface;
   B. a replicated storage request broadcast module for retrieving enqueued storage requests from said storage request queue and generating retrieved storage requests for broadcast to the storage nodes which maintain ones of the replicated partitions of the replicated partition group.

30. A storage node as defined in claim 29 in which the replicator module further comprises a replicated broadcast log, the replicated storage request broadcast module enabling the replicated broadcast log to maintain a record of the replicated storage requests broadcast by the replicated storage request broadcast module.

31. A storage node as defined in claim 30 in which the replicator module further includes a replicated storage request receiver module for receiving the replicated storage requests from the network interface and for providing the received replicated storage requests to the local request handler.

32. A storage node as defined in claim 31 in which the replicated storage request receiver module further generates an acknowledgment for transmission by the network interface to the one of the storage nodes which maintains the master partition.

33. A storage node as defined in claim 31 in which in which the replicator module farther comprises a replicated broadcast log for maintaining a record of the replicated storage requests broadcast by the replicator module, the replicated broadcast log removing the records of replicated storage requests for which acknowledgments have been received from all of the storage nodes which maintain replicated partitions of said replicated partition group.

34. A storage node as defined in claim 32 in which the replicated storage request receiver module operates in a write-through mode, in which it generates said acknowledgment to said replicated storage request when the one of the replicated partitions of the replicated partition group maintained thereby has been updated in response to the replicated storage request.

35. A storage node as defined in claim 32 in which the replicated storage request receiver module operates in a write-back mode, in which it generates said acknowledgment to said replicated storage request when the replicated storage request has been received.

36. A storage node as defined in claim 28 further comprising a recovery module for providing recovery services after correction of a malfunction in connection with another of said storage nodes which maintains one of said replicated partitions of said replicated partition group to update the other storage node's replicated partition so that it will be consistent with the other replicated partitions of the replicated partition group.

37. A storage node as defined in claim 36 further comprising a recovery log maintained by said recovery module after said other of said storage nodes has malfunctioned, the recovery log maintaining a record of portions of the replicated partition which are updated during a malfunction period.

38. A storage node as defined in claim 37 in which said recovery module, after correction of the malfunction in connection with the other storage node, uses the recovery log to facilitate updating of the replicated partition on the other storage node.

39. A storage node as defined in claim 37 in which the recovery log comprises a plurality of entries organized in a tree, each entry identifying one of said portions of said master partition.

40. A storage node as defined in claim 39 in which:
A. each of said portions is associated with a block identifier and a length, the block identifier identifying a storage block on which said portion of the master partition is stored on said one of said storage nodes;
B. said tree includes a plurality of entries each identifying a one of said portions of the master partition updated during the malfunction period, the entries identifying non-overlapping portions of said master partition, one of said entries comprising a root entry associated with a first of said portions of the master partition updated during the malfunction period, and each of said other entries comprising a respective "lower" or "higher" child entry defining a respective one of said portions of the master partition updated during the malfunction period whose block identifier is respectively lower or higher than the block identifier of its respective parent entry.

41. A storage node as defined in claim 40 in which said recovery module generates entries for the recovery log in response to receipt of replicated storage requests during the malfunction period.

42. A storage node as defined in claim 41 in which, in response to receipt of a first one of said replicated storage requests during the malfunction period, the recovery module generates said root entry.

43. A storage node as defined in claim 42 in which, in response to receipt of each subsequent replicated storage request during the malfunction period, the recovery module selectively generates a new entry or updates selected existing ones of entries so as to provide that the entries of said tree identify non-overlapping portions of said master partition.

* * * * *